JACK M. SLOUGH
JOSEPH LICHTENSTEIN
INVENTORS.

BY Lyon & Lyon
ATTORNEYS.

United States Patent Office 2,808,243
Patented Oct. 1, 1957

2,808,243
COOLING TOWER

Jack M. Slough, Whittier, Calif., and Joseph Lichtenstein, Floral Park, N. Y., assignors to Santa Fe Tank & Tower Company, Inc., Los Angeles, Calif., a corporation of California Application December 13, 1954, Serial No. 474,842

2 Claims. (Cl. 261—24)

This invention relates to cooling towers and has particular reference to cooling towers of the induced draft type.

The design of conventional cooling towers is based upon a uniform mixture of air and water, and great pains are taken to accomplish and maintain even air and water distribution. The water tower of this invention departs radically from this concept in that two basically different types of tower filling or packing are used and these two basic types require variation of the air and water flow within different parts of the tower. One of the principal objects of this invention is to provide a cooling tower of maximum efficiency, made possible by such radically different and novel design.

Another object of this invention is to provide a cooling tower having a high heat transfer coefficient type of filling in a cross-flow section and a relatively lower heat transfer coefficient type of filling in a counter-flow section.

Another object of this invention is to provide a cooling tower having a cross-flow section and a counter-flow section, and means for adjusting the air and water flow through said sections.

Another object of this invention is to provide a novel adjustable air drift eliminator section for a cooling tower of the type described.

Other objects and advantages of this invention it is believed will be readily apparent from the following detailed description of a preferred embodiment thereof when read in connection with the accompanying drawings.

Figure 1:
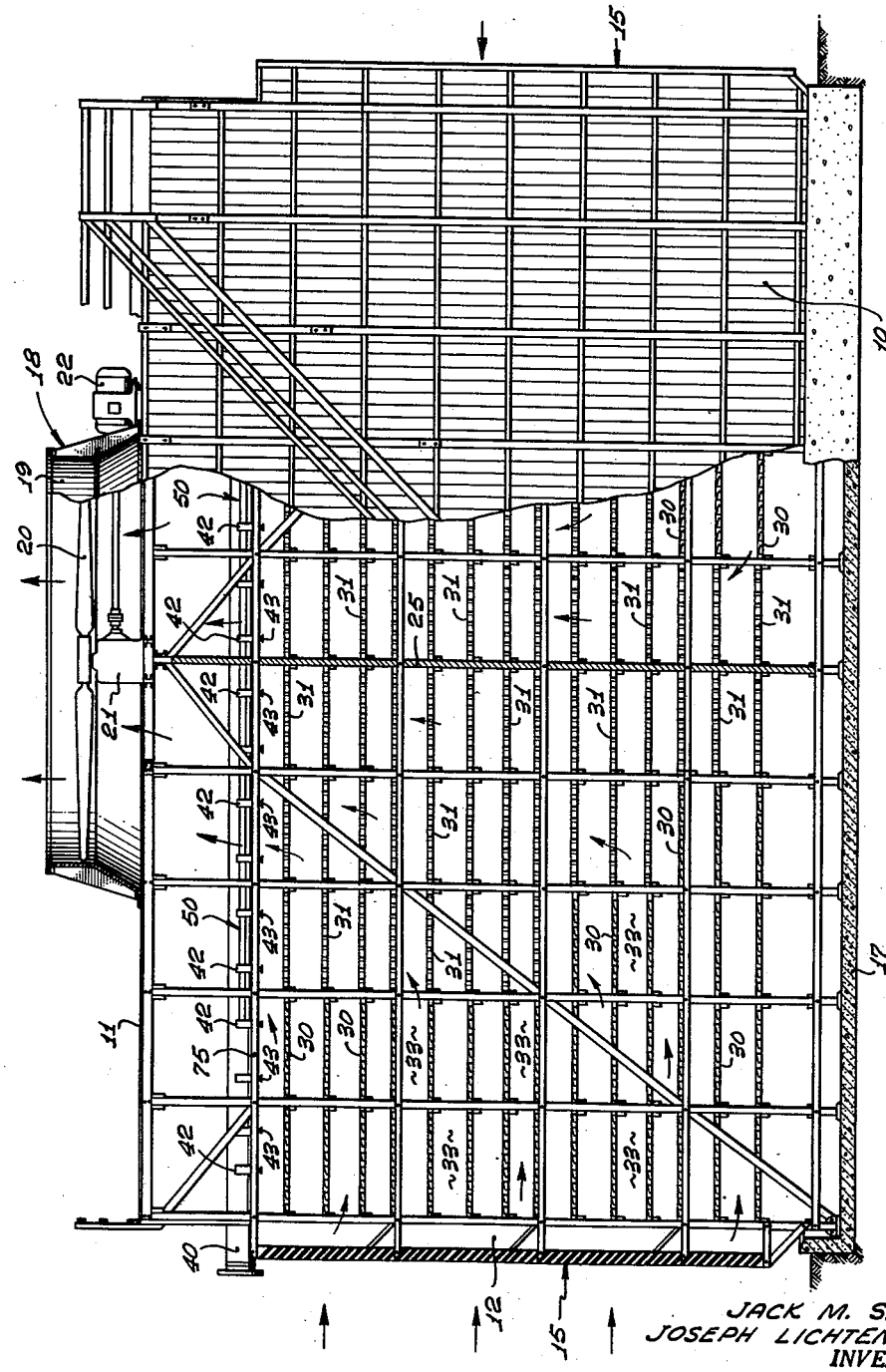
Figure 1 is an end elevation of a cooling tower constructed in accordance with this invention.
Figure 2:
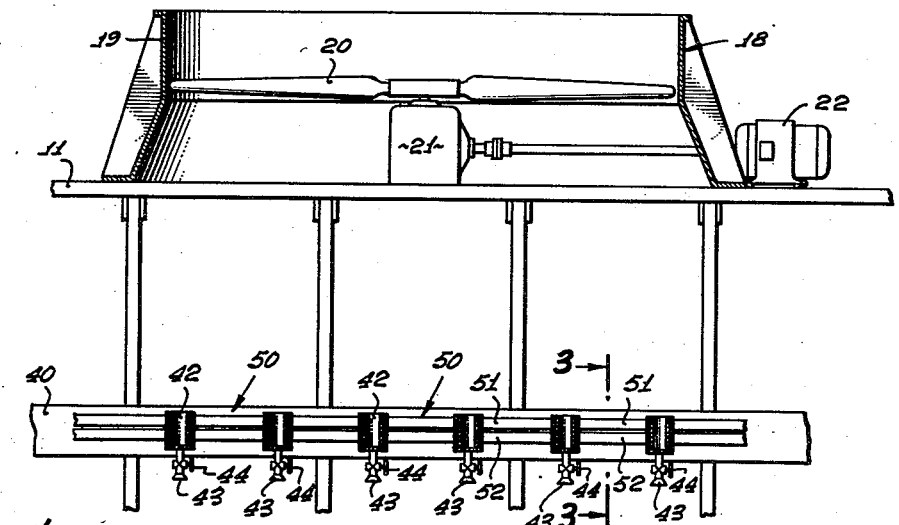
Figure 2 is a fragmentary end elevation, similar to Figure 1, but on an enlarged scale.

Referring now to the drawings, the cooling tower of this invention is provided with a wall 10 at each end thereof, a top wall 11 and side openings 12 for air extending the entire length of the tower, the openings being defined by lower sections 15. The tower assembly is supported on and suitably anchored to a concrete water catch basin 17. A conventional fan assembly 18, including a stack 19, fan 20, gear box 21 and motor 22, is located on the top of the tower in a central position. Depending upon the size of the tower, one or more of the fan assemblies 18 are utilized; if more than one, they are spaced longitudinally of the tower. A longitudinal partition 25 divides the tower into two identical halves and, accordingly, only one of said halves will here be described in detail.

The tower packing or filling consists of a plurality of horizontal decks formed in two roughly vertical sections, an outer longitudinal section of decks 30 and an inner or central longitudinal section of decks 31. The decks 30, which are positioned adjacent the air inlet openings in the cooling tower sides, are formed of closely-spaced slat members which permit restricted downflow of water without substantial upward flow of air, the decks 30 providing spaced horizontal passages 33 through which the fresh, inlet air is drawn in cross-flow relationship to the descending water. The decks 31 are formed of relatively widely-spaced vertical slats permitting free flow of water and air in counter-current relation.

A water header 40, one for each of the fan assemblies 18, is supported immediately below each of the fan assemblies, lying transversely across the tower. A plurality of open-topped flumes 42 extend outwardly from each side of the header in directions longitudinally of the tower. Depending from each of the flumes is a plurality of water nozzles 43 for distributing the water over the filling. Each of the nozzles is provided with means, such as a valve 44 or variable-sized orifice rings for the nozzles, for adjusting the water volume flowing therethrough.

Figure 3:
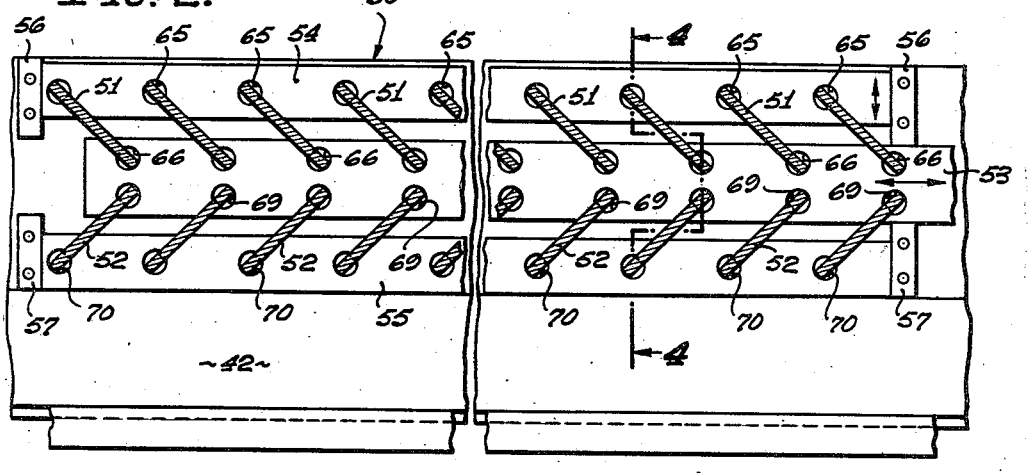
Figure 3 is a sectional elevation taken substantially on the line 3—3 of Figure 2.
Figure 4:
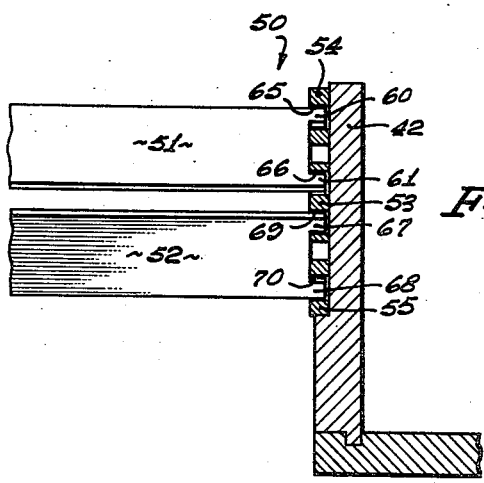
Figure 4 is a sectional elevation taken substantially on the line 4—4 of Figure 3.

Means are provided for adjusting the volume of air put through the tower and, as shown in the drawings, these means may include the adjustable drift eliminators generally indicated 50. Each of these eliminators consists of a plurality of parallel upper and lower eliminator boards 51 and 52 spaced longitudinally of the tower for the entire length thereof. As shown in Figure 3, the boards 51 and 52 are inclined at angles from each other, forming a circuitous path for the travel of air therebetween, and they are operably connected to the flumes 42 for adjustment by means of stationary cleats 53 rigidly secured to both sides of the flumes and upper and lower cleats 54 and 55, the ends of which are inserted in grooves formed by the flume side walls and by spaced block members 56 and 57 secured to the flume side walls. The upper and lower cleats are thus vertically movable in said grooves, and the friction between the cleats, the flume walls and the block members is sufficient to maintain the cleats in the desired adjusted positions. The ends of each of the eliminator boards 51 are provided with a pair of ear members 60 and 61, each of the ear members 60 being inserted in an aperture 65 in an upper cleat 54 and each of the ear members 61 being inserted in an aperture 66 in a stationary cleat 53. From the description thus far it will be understood that the boards 51 will pivot about their lower edges upon vertical movement of the appropriate cleats 54 in either direction. Similarly, the lower boards 52 are each provided at the ends thereof with a pair of ear members 67 and 68 seated in apertures 69 and 70 in the stationary and lower cleats 53 and 55, respectively, for similar pivotal movement upon vertical displacement of the cleats 55.

As shown in Figure 1, the drift eliminators cover the portion of the tower containing the decks 31. A partition member 75 covers the remaining portions of the tower to prevent vertical air flow from those portions of the tower containing the decks 30.

In operation of the cooling tower of this invention, the fan 20 is energized to pull air into the tower through the open sides, the air flowing generally in the direction of the arrows, first horizontally between the decks 30, then substantially vertically through the decks 31 and then out through the stack. At the same time, water is flowing through the nozzles 43 and downwardly through the decks 30 and 31. From the description thus far it will be understood that the water flow through the nozzles over the respective decks 30 and 31 can be independently adjusted to obtain relatively high water concentration through the decks 30 and relatively low water concentration through the decks 31, and the air flow through the various portions of the tower can be independently adjusted by means of the drift eliminators 50, so that optimum heat exchange may be realized. Thus the relatively low heat transfer efficiency inherent in the cross-flow through filling formed by the decks 30 is offset by the high heat transfer coefficient of this filling, by the greater amount of splash surface available, and by the greater driving potential due to the fact that the air is less spent immediately upon entering the tower. Similarly the very low resistance to air flow in the portion of the tower formed by the decks 31 offsets the relatively lower heat transfer coefficient inherent in this section.

Having fully described our invention, it is to be understood that we do not wish to be limited to the details set forth, but our invention is of the full scope of the appended claims.

We claim:

1. In a cooling tower having end walls, open side walls and a top, a fan assembly mounted on said top for inducing air through said tower from said open side walls, fill-comprising a plurality of vertically spaced horizontal decks adjacent said side walls and extending substantially from top to bottom thereof, said decks permitting downflow of water therethrough but preventing substantial upward flow of air therethrough and providing horizontal passages for cross-flow of said air with respect to said water and in heat exchange relationship therewith, and additional filling in the central portion of said tower, said filling comprising a plurality of second decks, said second decks permitting free counter-flow of air and water, and means for independently regulating the amount of air at spaced points in said tower, said means comprising a plurality of adjustable air drift eliminators mounted above said second decks.

2. In a cooling tower having end walls, open side walls and a top, a fan assembly mounted on said top for inducing air through said tower from said open side walls, filling comprising a plurality of vertically spaced horizontal decks adjacent said side walls and extending substantially from top to bottom thereof, said decks permitting downflow of water therethrough but preventing substantial upward flow of air therethrough and providing horizontal passages for cross-flow of said air with respect to said water and in heat exchange relationship therewith, and additional filling in the central portion of said tower, said filling comprising a plurality of second decks, said second decks permitting free counter-flow of air and water, means for distributing water over said decks, means for independently regulating the amount of water distributed over spaced portions of said tower, and means for independently regulating the amount of air at spaced points in said tower, said means comprising a plurality of adjustable air drift eliminators mounted above said second decks.

References Cited in the file of this patent

UNITED STATES PATENTS

| | | |
|---|---|---|
| 1,770,657 | Calhoun | July 15, 1930 |
| 2,066,832 | Gay | Jan. 5, 1937 |
| 2,247,514 | Mart | July 1, 1941 |
| 2,394,755 | De Flon | Feb. 12, 1946 |
| 2,497,389 | Ahrens | Feb. 14, 1950 |
| 2,680,603 | Taylor | June 8, 1954 |
| 2,732,190 | Mart | Jan. 24, 1956 |

FOREIGN PATENTS

| | | |
|---|---|---|
| 518,373 | Great Britain | Feb. 26, 1940 |